United States Patent [19]

Bonville et al.

[11] Patent Number: 4,816,040
[45] Date of Patent: Mar. 28, 1989

[54] REMOVAL OF AMMONIA AND CARBON DIOXIDE FROM FUEL CELL STACK WATER SYSTEM BY STEAM STRIPPING

[75] Inventors: Leonard J. Bonville, Marlborough; Albert P. Grasso, Vernon; Richard A. Sederquist, Newington, all of Conn.

[73] Assignee: International Fuel Cells Corporation, South Windsor, Conn.

[21] Appl. No.: 108,848

[22] Filed: Oct. 15, 1987

[51] Int. Cl.[4] .................. B01D 53/14; B01D 19/00
[52] U.S. Cl. ........................................... 55/42; 55/44; 55/48; 55/51; 55/54; 55/70
[58] Field of Search .................. 55/41, 42, 44, 48, 51, 55/54, 55, 70

[56] References Cited

U.S. PATENT DOCUMENTS

| | | | |
|---|---|---|---|
| 1,216,059 | 2/1917 | Bosch | 55/70 |
| 2,500,291 | 3/1950 | Liebel et al. | 55/70 X |
| 2,685,941 | 8/1954 | Kassel | 55/55 X |
| 3,754,376 | 8/1973 | Kent | 55/51 |
| 3,805,536 | 4/1974 | Lynn | 55/70 X |
| 4,054,431 | 10/1977 | Kotcharian | 55/70 |
| 4,318,715 | 3/1982 | Chou | 55/55 X |
| 4,352,680 | 10/1982 | Hackler | 55/48 |
| 4,547,293 | 10/1985 | King et al. | 210/638 |
| 4,632,676 | 12/1986 | Mosebach et al. | 55/70 X |
| 4,668,250 | 5/1987 | Drese | 55/70 |
| 4,702,898 | 10/1987 | Grover | 55/70 X |

FOREIGN PATENT DOCUMENTS

| | | | |
|---|---|---|---|
| 76213 | 9/1970 | German Democratic Rep. | |
| 80927 | 7/1975 | Japan | 55/70 |
| 2040901 | 9/1980 | United Kingdom | 55/70 |

Primary Examiner—Robert Spitzer
Attorney, Agent, or Firm—William W. Jones

[57] ABSTRACT

The fuel cell power plant has a closed water circulation system whose only source of fresh water is the electrochemical reaction in the power section. The water becomes contaminated with ammonia and carbon dioxide in the fuel contact cooler and the ammonia and carbon dioxide are stripped out of the water by steam produced by operating the plant. The ammonia and carbon dioxide-laden steam is vented from the plant. The amount of water lost from the plant as steam is less than the amount of available water produced in the electrochemical reaction.

6 Claims, 1 Drawing Sheet

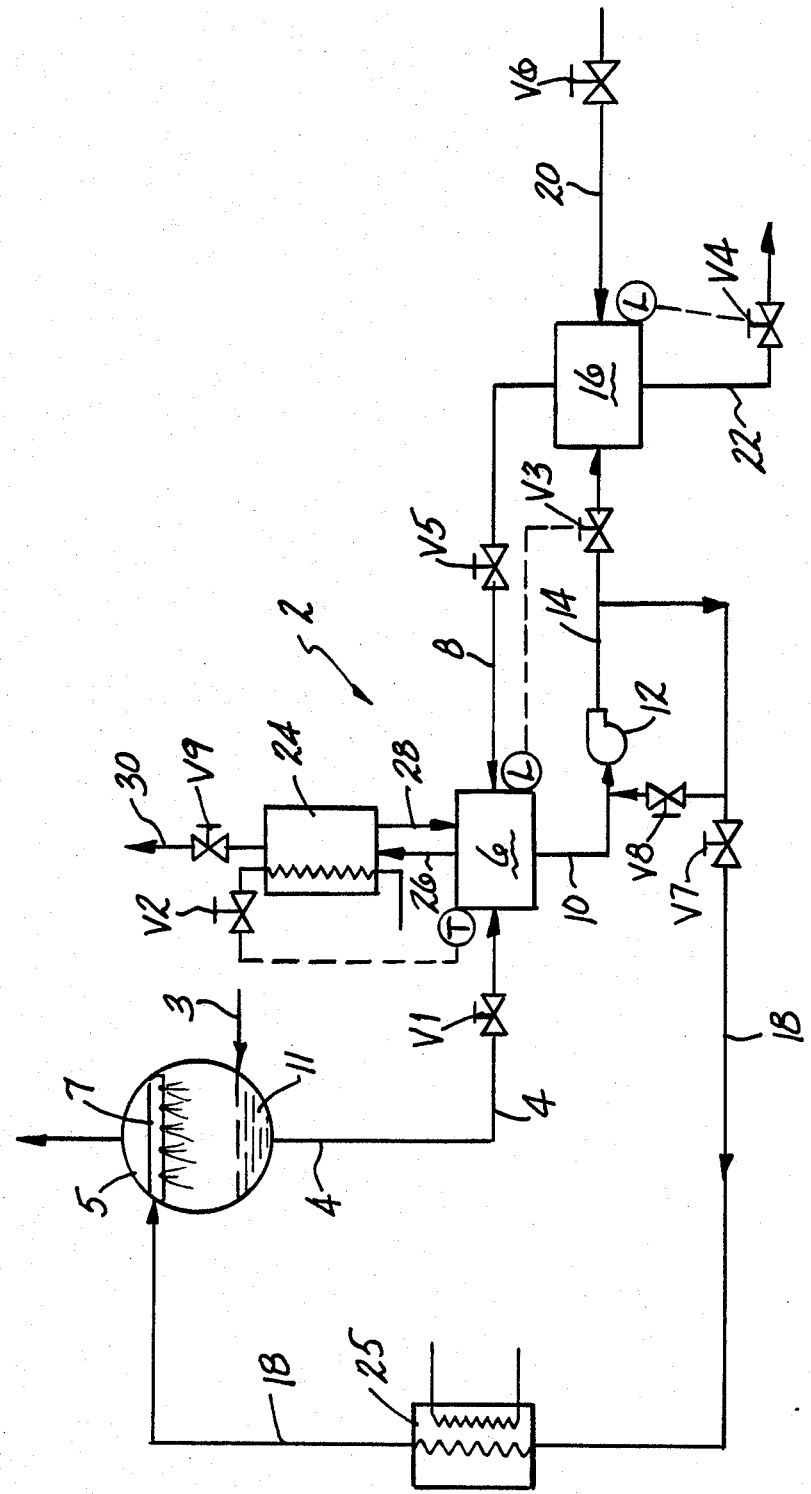

4,816,040

REMOVAL OF AMMONIA AND CARBON DIOXIDE FROM FUEL CELL STACK WATER SYSTEM BY STEAM STRIPPING

DESCRIPTION

TECHNICAL FIELD

This invention relates to a method for removing ammonia and carbon dioxide from fuel cell power plant system water by steam stripping the water. More particularly, this invention relates to the removal of ammonia from water by steam stripping in a system which system is closed, and wherein the ammonia is present in concentrations of about 400 ppm by weight or less.

BACKGROUND ART

Fuel cell power plants with closed water circulating systems are known in the prior art. It is highly preferably to operate these types of plants without requiring water, so called "make up" water, to be added to the system periodically. Since the electrochemical reaction in the power plant produces water as a by-product, this product water can be recovered and used to replenish water used by the power plant. The water in the circulating system is used for cooling the fuel cell and as steam in the fuel reforming process. To operate the plant, a raw hydrocarbon fuel such as methane, naphtha or the like is mixed with steam from the plant and catalytically reformed to a hydrogen rich fuel suitable for consumption in the power section. Depending on the nitrogen content of the raw hydrocarbon fuel, the reformed fuel gas will contain varying amounts of ammonia, as well as other noncondensable gases such as carbon dioxide, carbon monoxide and argon. The amount of ammonia in the fuel gas can be as high as 550 ppm by volume, and, since ammonia is harmful to the cells in the power section, it must be reduced to less than 2 ppm by volume before the fuel gas is fed into the power section. The decontamination of the fuel gas is accomplished in a vessel called a "contact cooler". The fuel gas is fed from the reformer into the bottom of the contact cooler wherein it then rises in the contact cooler vessel. At the top of the contact cooler, cool water is sprayed into the rising flow of fuel gas. The cool water both lowers the temperature of the fuel gas to a level suitable for use in the power section, and also strips out the ammonia, some carbon dioxide, carbon monoxide and argon, as well as some hydrogen, from the fuel gas. This operation also condenses the steam out of the fuel gas. The resultant contaminated water then settles into a sump at the bottom of the contact cooler and is continuously withdrawn therefrom. This water must be cleansed of the ammonia, carbon dioxide, carbon monoxide, argon and hydrogen contaminants before it can be reused in the power plant. The water could readily be decontaminated with conventional ion exchange demineralizing beds of the type used in fuel cell power plants. The use of the standard on-board demineralizing beds is not acceptable, however, with power plants having closed water circulation systems because the demineralizing beds, when used to decontaminate the water directly from the contact cooler, must be frequently regenerated. During regeneration of the ion exchange beds, waste water is created in the power plant which must be removed. This means that excessive make up water must be employed when the demineralizing beds are used to decontaminate the contact cooler drain water. It is thus apparent that this solution is not satisfactory for a power plant with a closed water circulating system which relies solely on the recovery of product water for replenishing water used during operation of the power plant.

The amount of ammonia contained in the water from the contact cooler will be about 400 ppm by weight or less. While this is a relatively small amount, it still affects the power plant adversely and must be lowered to about 30 ppm by weight or less. Once the ammonia concentrations are lowered to the 30 ppm by weight level, the water can be further stripped of ammonia in the on-board demineralizing beds without harming the latter. The chemical equivalents ratio of the ammonia to carbon dioxide in the contaminated water is about one to one. When ammonia alone is present as a contaminant in the water, one way of removing the ammonia has been to strip it from the water with steam. The steam will be passed through the water and will entrain the ammonia in a gaseous form, thereby removing the ammonia from the water. When the ammonia is present along with an acid gas such as carbon dioxide, problems are seen to arise when one tries to strip the ammonia and carbon dioxide from the water with steam alone, as noted in U.S. Pat. Nos. 3,754,376 granted Aug. 28, 1973 to R. D. Kent; and 4,547,293 granted Oct. 15, 1985 to C. J. King et al. The prior art indicates generally that the ammonia and carbonates can not be steam stripped in a single procedure, but must be stripped in separate steps at different controlled pH values, with the carbonate stripping out at a lower pH and the ammonia stripping out at a higher pH. Certain art, as exemplified by East German Patent No. 76,213 of Sept. 20, 1970, discloses that ammonia and carbonate ions will form unstable compounds in liquors produced in the soda industries, which compounds can be steam stripped from the liquors when the ammonia content of the liquors is very high, as for example, above 150,000 ppm levels. When the ammonia content is present at lower levels, however, as for example, about 18,000 ppm by volume, the two stage separation approach is seen to be necessary, as set forth in U.S. Pat. No. 4,352,680 granted Oct. 5, 1982 to E. Hackler.

Since the addition of chemicals to adjust the pH of the water could increase the total dissolved contaminants in the water, the subsequent burden on the fuel cell power plant demineralizing beds and their waste water quantities could exceed that due to the ammonia and carbon dioxide problem. This is unacceptable to fuel cell power plants with closed water systems.

DISCLOSURE OF THE INVENTION

We have discovered that ammonia and carbonates can be steam stripped from contaminated fuel cell power plant water without the necessity of special pH shifting, when the concentration of the ammonia is about 400 k ppm by volume or less, and when the chemical equivalent ratio of ammonia to carbonates is approximately one to one. The steam stripping can be accomplished with steam created during normal operation of the power plant. The contaminants, once stripped from the water, are vented from the plant along with a portion of the stripping steam. The amount of water lost from the system as vented contaminant-laden steam is less than the amount of available water produced by the electrochemical reaction in the fuel cells, thereby obviating the need for frequent additions of make up water from external sources. We have discovered that the ammonia level in the water can be reduced to less than 30 ppm by volume by the steam stripping, and that this lower level of ammonia can then be removed from the water by demineralizaton beds in the system.

It is therefore an object of this invention to provide a method for removing ammonia and carbonate contaminants from fuel cell power plant system water.

It is a further object of this invention to provide a method of the character described wherein the contaminants will be removed concurrently from the water without the need to adjust the pH of the water.

It is an additional object of this invention to provide a method of the character described wherein the contaminants will be removed using energy produced during normal operation of the power plant.

It is another object of this invention to provide a method of the character described wherein the contaminants are removed from the system with minimal attendant loss of system water.

These and other objects and advantages will become more readily apparent from the following detailed description of a preferred embodiment of the invention when taken in conjunction with the accompanying drawing.

BRIEF DESCRIPTION OF THE DRAWING

The Figure is a schematic view of a portion of the water circulation system of a fuel cell power plant which utilizes the method of this invention.

BEST MODE FOR CARRYING OUT THE INVENTION

Referring to the drawing, the system, denoted generally by the numeral 2, includes an inlet line 3 from the reformer (not shown) through which reformer effluent hydrogen rich fuel gas, for the plant power section, is fed to the contact cooler vessel 5. A water spray nozzle assembly 7 is disposed in the upper portion of the contact cooler 5 and is operable to spray water into the interior of the contact cooler 5. The reformer effluent gas, which is at a temperature in the range of about 350° F. to 400° F., enters the lower region of the contact cooler 5 and rises therein through the descending water spray. The water from the spray nozzles 7 is about 130° F. in temperature. The hot gases rising through the cooler water spray causes a cooling of the fuel gas to a temperature of about 240° F. or lower and results in a stripping of ammonia, some carbon dioxide, carbon monoxide, argon and some hydrogen from the fuel gas into the water, which collects in a sump 11 in the bottom of the contact cooler 5. The contact cooler water in the sump 11 will be at a temperature of 256° F. and a pressure of about 132 psia. This hot, pressurized contaminated water is withdrawn from the sump 11 through a drain line 4 and taken thence to a flash tank 6. The hot pressurized water in the line 4 enters the flash tank 6 through a restricted orifice so that, once in the tank 6, the water will flash to produce steam through the pressure drop from the line 4 to the tank 6. The pressure in the tank 6 will be about 20 psia and the temperature of the water about 228° F. In addition to the steam created by the flashing, additional steam is fed into the tank 6 through line 8, as will be explained hereinafter. The flashing of the steam in the tank 6 will remove about 54% of the ammonia in the water, and the partially decontaminated water is taken from the tank 6 into a drain line 10 to a pump 12 which pumps the water through a first line 14 to a second steam stripper 16, and also through a second branch line 18 which goes back to the reformer effluent fuel gas contact cooler 5 via a heat exchanger 25 which cools the water to a temperature of about 130° F. Thus, varying proportions of the water from the flash tank 6 may be returned to the fuel gas cooler, and the remainder undergoes further ammonia removal in the steam stripper 16. Steam at a temperature of about 375° F. and a pressure of about 188 psia from the power section of the power plant is fed through line 20 into the steam stripper 16 where the steam passes through the water from the line 14. The water and steam in the steam stripper 16 will be at a temperature of about 248° F. and a pressure of about 29 psia. The steam from the line 20 is operable to remove about 70% of the remaining ammonia from the water in the steam stripper 16.

The further decontaminated water is removed from the steam stripper 16 through a drain line 22 and taken therein to the water storage tank in the power plant for further water purification before being returned to the water system. The steam from the steam stripper 16, now including ammonia gases, is drawn into the line 8 and taken thence to the flash tank 6. The steam in the flash tank 6, partly flash steam and partly steam from the steam stripper 16, rises into a condenser 24 through line 26. Water is condensed out of the steam-ammonia mixture in the condenser 24 to return back to the flash tank 6 via line 28. The remaining steam and ammonia mixture is vented out of the condenser 24 through line 30. The temperature in the condenser 24 is about 228° F.

The system 2 also includes various flow control valves $V_1$ through $V_9$ which control flow rates, flow paths and other parameters in the system 2. The valve $V_1$ controls the flow rate of reformer effluent and is operated by the plant microprocessor control. The valve $V_2$ is controlled by the temperature in the flash tank 6 and is operable to vary the coolant flow rate to the condenser 24 thereby controlling the temperature in the latter. The valves $V_3$ and $V_4$ control the flow rates of water through the lines 14 and 22, respectively, and are controlled by the levels of water in the flash tank and steam stripper 6 and 16 respectively. Valves $V_5$ and $V_6$ control the flow rate of steam through the lines 8 and 20 respectively; and are themselves controlled by the power plant microprocessor control. Valves $V_7$ and $V_8$ control the amount of water recirculated back to the reformer effluent cooler and are controlled by the plant microprocessor control. Finally, valve $V_9$ controls the rate at which steam and contaminant gases are vented from the condenser 24 and is itself controlled by the plant microprocessor.

Using the system of this invention at predetermined flow rates, about 85% of the ammonia contaminant can be removed from the water by the time the water reaches the line 22. The removed ammonia is vented from the subsystem along with only about 5% of the product water in the water circuit. This low level of water loss is the result of combining the steam from the stripper 16 and the flash tank 6 and passing the combined steam-ammonia mixture into the condenser 24 where some of the water is recovered from the mixture and returned to the flash tank 6. The single vent is an important feature which helps achieve the low rate of water loss.

An example of the operation of the aforesaid system is as follows. When a raw hydrocarbon fuel is used which has a nitrogen content of 7%, and which is reformed under kinetic conditions, i.e., with the gas constantly moving through the reformer, and not dwelling therein, sufficient nitrogen will be converted to ammonia to produce a cooling stripper water in the line 4 which will have an ammonia content of 75 ppm by weight when the power plant is running at full power. The water in the line 10 after leaving the flash tank 6 will have an ammonia content of about 46 ppm by weight, and the water in the line 22 will have an ammonia content of 14 ppm by weight. These ammonia levels will be achieved by operating the system at the temperature and pressure levels disclosed above. It has been determined that the system of this invention can adequately decontaminate water when the power plant is using a raw hydrocarbon fuel with a nitrogen content of up to 12% when the plant is run at any power level between standby and full.

Since many changes and variations of the disclosed embodiment of the invention may be made without departing from the inventive concept, it is not intended to limit the invention otherwise than as required by the appended claims.

We claim:

1. In a fuel cell power plant having a closed water circulating system wherein under normal operating conditions water in the system is replenished solely by product water formed in the fuel cells, a method for removing ammonia from water in the system, which ammonia is present in the water in concentrations of less than about 400 ppm by weight, said method comprising the steps of:
    (a) transferring ammonia, carbon dioxide, and other non-condensible gases from a reformed hydrogen rich fuel gas initially containing such non-condensible gases, to water in the system which is initially low in such gases, by passing the hydrogen rich fuel gas through a spray of the system water thereby creating a supply of contaminated system water containing ammonia contaminants in amounts of less than about 400 ppm by weight;
    (b) performing two successive steam stripping operations on the contaminated system water, while maintaining the latter at substantially the same pH, to transfer major amounts of the ammonia from the system water to a steam carrier;
    (c) combining the ammonia-laden steam from the two steam stripping operations and passing the combined steam through a condenser to condense water out of the ammonia-laden steam; and
    (d) venting ammonia-laden steam from the condenser and out of the water circulating system, the vented steam having a water content which is less than the amount of product water formed in the fuel cells whereby externally sourced makeup water is not normally required to operate the power plant.

2. The method of claim 1 wherein the first steam stripping operation is performed by depressurizing the contaminated system water sufficiently to flash steam from the contaminated system water.

3. The method of claim 2 wherein the steam is flashed by lowering the pressure of the contaminated system water from about 132 psia to about 20 psia thereby cooling the water from a temperature of about 256° F. to about 228° F.

4. The method of claim 3 wherein the second steam stripping operation is performed using steam generated in a fuel cell cooling portion of the water circulating system, and wherein contaminant-laden steam from the second steam stripping operation is mingled with steam in the first steam stripping operation.

5. The method of claim 4 wherein the steam used in the second steam stripping operation is at a temperature of about 375° F. and a pressure of about 188 psia.

6. The method of claim 5 wherein the first steam stripping operation is operable to remove about 54% of the ammonia from the water, and the second stripping operation is operable to remove about 70% of the remaining ammonia from the water.

* * * * *